United States Patent
Ahn et al.

(10) Patent No.: US 8,014,621 B2
(45) Date of Patent: Sep. 6, 2011

(54) METHODS AND APPARATUSES FOR GENERATING AND RECOVERING 3D COMPRESSION DATA

(75) Inventors: Jeonghwan Ahn, Suwon-si (KR);
Mahnjin Han, Yongin-si (KR);
Dokyoon Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 856 days.

(21) Appl. No.: 11/401,348

(22) Filed: Apr. 11, 2006

(65) Prior Publication Data
US 2006/0239543 A1    Oct. 26, 2006

Related U.S. Application Data

(60) Provisional application No. 60/676,972, filed on May 3, 2005, provisional application No. 60/669,927, filed on Apr. 11, 2005.

(51) Int. Cl.
*G06K 9/36* (2006.01)
(52) U.S. Cl. ....................... 382/239
(58) Field of Classification Search .......... 382/239, 382/243
See application file for complete search history.

(56) References Cited

U.S. PATENT DOCUMENTS

| | | | |
|---|---|---|---|
| 5,057,940 A | 10/1991 | Murakami et al. | |
| 5,764,807 A * | 6/1998 | Pearlman et al. | 382/240 |
| 6,377,309 B1 | 4/2002 | Ito et al. | |
| 6,549,206 B1 * | 4/2003 | Signes | 345/473 |
| 6,563,500 B1 | 5/2003 | Kim et al. | |
| 6,571,018 B1 | 5/2003 | Kim | |
| 6,668,091 B1 * | 12/2003 | Kim et al. | 382/243 |
| 6,751,623 B1 * | 6/2004 | Basso et al. | 1/1 |
| 7,136,415 B2 | 11/2006 | Yun et al. | |
| 7,224,729 B1 | 5/2007 | Jang et al. | |
| 7,532,133 B2 * | 5/2009 | Ahn et al. | 341/51 |
| 2001/0028744 A1 * | 10/2001 | Han et al. | 382/232 |
| 2004/0111171 A1 | 6/2004 | Jang et al. | |

(Continued)

FOREIGN PATENT DOCUMENTS

JP    10164448    6/1998

(Continued)

OTHER PUBLICATIONS

Tran et al., "Exploring MPEG-4 BIFS Features for Creating Multimedia Games", XP-002511388, ARTEMIS Project Unit, Evry-France, 2003 IEEE, pp. 429-432 (in English).

(Continued)

*Primary Examiner* — Wenpeng Chen
(74) *Attorney, Agent, or Firm* — Staas & Halsey LLP

(57) ABSTRACT

A method of generating and recovering three-dimensional (3D) compression data and an apparatus to perform the method is described. The method includes generating configuration information of a 3D compression data sequence, generating a plurality of pieces of individual 3D compression data to be included in the 3D compression data sequence, and generating the 3D compression data sequence by combining the plurality of pieces of the individual 3D compression data, combining the 3D compression data sequence with the configuration information, and outputting the combined result. The generating of each of the plurality of pieces of individual 3D compression data includes generating individual configuration information of the piece of individual 3D compression data, generating a start code according to a data type of the piece of individual 3D compression data, and generating the 3D compression data according to the data type.

29 Claims, 5 Drawing Sheets

U.S. PATENT DOCUMENTS

2004/0236859 A1 11/2004 Leistad et al.
2004/0263530 A1* 12/2004 Sahuc et al. ................. 345/619
2005/0132385 A1* 6/2005 Bourges-Sevenier ......... 719/328
2006/0257016 A1 11/2006 Shioi et al.

FOREIGN PATENT DOCUMENTS

JP 11-177946 7/1999

OTHER PUBLICATIONS

Signès et al., "MPEG-4's Binary Format for Scene Description", XP-002133302, Jan. 11, 2000, pp. 22 (in English).
Japanese Office Action for corresponding Japanese Patent Application No. 2008-506370 dated Apr. 27, 2010 (3 pgs).
U.S. Appl. No. 11/401,412, filed Apr. 11, 2006, Jeonghwan Ahn et al., Samsung Electronics Co., LTD.
U.S. Appl. No. 11/401,412, filed Jan. 25, 2007, Office Action.
U.S. Appl. No. 11/401,412, filed Jul. 12, 2007, Office Action.
U.S. Appl. No. 11/401,412, filed Oct. 29, 2007, Notice of Allowance.
U.S. Appl. No. 11/401,412, filed Dec. 14, 2007, Office Action.
U.S, Appl. No. 11/401,412, filed Jun. 17, 2008, Final Office Action.
U.S. Appl. No. 11/401,412, filed Oct. 21, 2008, Advisory Action.
U.S. Appl. No. 11/401,412, Mar. 13, 2008, Notice of Allowance.
European Search Report for corresponding European Patent Application No. 06747340.5 dated Feb. 5, 2009, 5 pages (in English).

* cited by examiner

METHODS AND APPARATUSES FOR GENERATING AND RECOVERING 3D COMPRESSION DATA

CROSS-REFERENCE TO RELATED APPLICATIONS

This application claims the benefit of U.S. Provisional Application No. 60/669,927, filed on Apr. 11, 2005, and U.S. Provisional Application No. 60/676,972, filed on May 3, 2005, in the United States Patent & Trademark Office, the disclosures of which are incorporated herein by reference.

BACKGROUND OF THE INVENTION

1. Field of the Invention

The present invention relates to a method of generating three-dimensional (3D) graphic compression data, and an apparatus to perform the method, and a method of recovering 3D graphic compression data, and an apparatus to perform the method, and, more particularly, to a method of generating 3D graphic compression data, and an apparatus to perform the method, and a method of recovering 3D graphic compression data, and an apparatus to perform the method, in a mobile environment.

2. Description of the Related Art

The current state of the evolution of mobile devices allows some services, such as 3D games, 3D avatars, or 3D shopping, which were previously considered to be impossible or impractical in a mobile environment, to be provided. As a result, such services have been recognized as new business models to be used in mobile communications or content providers.

However, the mobile devices are limited in terms of computational complexity and power consumption, and a bandwidth of a wireless network is also limited. Thus, an efficient method of representing and compressing 3D graphic data is needed to overcome these limitations in a mobile environment.

SUMMARY OF THE INVENTION

The present invention provides a method of generating three-dimensional (3D) graphic compression data, and an apparatus to perform the method, and a method of recovering 3D graphic compression data, and an apparatus to perform the method, in order to compactly represent the 3D graphic data and effectively transmit the data via a wireless network in a mobile environment that is restricted in power consumption and computational complexity.

Additional aspects and/or advantages of the invention will be set forth in part in the description which follows and, in part, will be apparent from the description, or may be learned by practice of the invention.

According to an aspect of the present invention, there is provided a method of generating three-dimensional (3D) compression data, the method comprising generating configuration information of a 3D compression data sequence; generating a plurality of pieces of individual 3D compression data to be included in the 3D compression data sequence; and generating the 3D compression data sequence by combining the plurality of pieces of the individual 3D compression data, combining the 3D compression data sequence with the configuration information, and outputting the combining result, wherein the generating of each of the plurality of pieces of individual 3D compression data comprises generating individual configuration information of the piece of individual 3D compression data; generating start code according to a data type of the piece of individual 3D compression data; and generating the 3D compression data according to the data type.

According to another aspect of the present invention, there is provided a method of recovering three-dimensional (3D) compression data, the method comprising separating a 3D compression data sequence and configuration information of the 3D compression data sequence from a received signal; separating a plurality of pieces of individual 3D compression data and individual configuration information for each of the pieces of individual 3D compression data from the 3D compression data sequence; separating each start code from the pieces of individual 3D compression data according to a data type of each of the pieces of individual 3D compression data; and decoding the pieces of individual 3D compression data using the data type included in the individual configuration information.

According to another aspect of the present invention, there is provided an apparatus to generate three-dimensional (3D) compression data, the apparatus comprising an encoder which generates different pieces of individual 3D compression data by encoding received 3D data according to a data type of the 3D data, generates a 3D compression data sequence by generating individual configuration information for each of the pieces of individual 3D compression data and combining the configuration information with the corresponding piece of individual 3D compression data, respectively, generates configuration information of the 3D compression data sequence, combines the configuration information with the 3D compression data sequence, and outputs the combining result; wherein, prior to the generation of the pieces of individual 3D compression data, the encoder generates a start code according to a data type of the pieces of individual 3D compression data.

According to another aspect of the present invention, there is provided an apparatus to recover three-dimensional (3D) compression data from a received signal, the apparatus comprising a decoder which separates a 3D compression data sequence and configuration information of the 3D compression data sequence from the received signal; separates a plurality of pieces of individual 3D compression data and individual configuration for each of the pieces of individual 3D compression data from the 3D compression data sequence; analyzes a data type code comprising information of a data type of the pieces of individual 3D compression data, which is included in the individual configuration information; and decodes the pieces of individual 3D compression data according to the data type code; wherein the decoder separates start code from the pieces of individual 3D compression data according to the data type.

According to another aspect of the present invention, there is provided a method of generating three-dimensional (3D) compression data, the method comprising generating configuration information of 3DCObjectSequence, which is the 3D compression data; generating 3DCObjects, which are a plurality of pieces of individual 3D compression data and are included in the 3D compression data; and generating a 3D compression data sequence by combining the plurality of pieces of individual 3D compression data, combining the 3D compression data sequence with configuration information of the 3D compression data sequence, and outputting the combining result. The generation of the pieces of individual 3D compression data comprises generating individual configuration information of the respective pieces of individual 3D compression data; generating start code according to a data type of the respective pieces of individual 3D compression data; and generating the 3D compression data according to the data type. The generation of the pieces of individual 3D compression data is realized by:

```
3DCObject( ) {
    3dc_object_start_code
    is_3dc_object_identifier
    if(is_3DC_object_identifier){
        3dc_object_verid
        3dc_object_priority
    }
    3dc_object_type_indication
    next_start_code( )
    if (3dc_object_type_indication == "Simple_3DMC") {
        3D_Mesh_Object( )
    }
    else if (3dc_object_type_indication == "Simple_WSSI") {
        WSS_start_code
        Wavelet_Mesh_Object( )
    }
    else if (3dc_object_type_indication == "Main_CI") {
        CoordIC_start_code
        CompressedCoordinateInterpolator( )
    }
    else if (3dc_object_type_indication == "Main_OI") {
        OriIC_start_code
        CompressedOrientationInterpolatort( )
    }
    else if (3dc_object_type_indication == "Main_PI") {
        PosIC_start_code
        CompressedPositionInterpolator( )
    }
    else if (3dc_object_type_indication == "Simple_BBA")
    {
        bba_object( )
    }
    (more object types and corresponding decoders can be defined.)
    if (next_bits( ) != "000 0000 0000 0000 0000 0001"
        next_start_code( )
},
``` wherein 3dc_object_start_code denotes code representing start of 3DCObject, is_3dc_object_identifier denotes an identifier of the 3DCObject, 3dc_object_verid denotes code representing identification of a version of the 3DCObject, 3dc_object_priority denotes code representing priority of the 3DCObject, 3dc_object_type_indication denotes a type of the individual 3D compression data, WSS_start_code, CoordIC_start_code, OriIC_start_code, and PosIC_start_code are start codes for data types, respectively.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
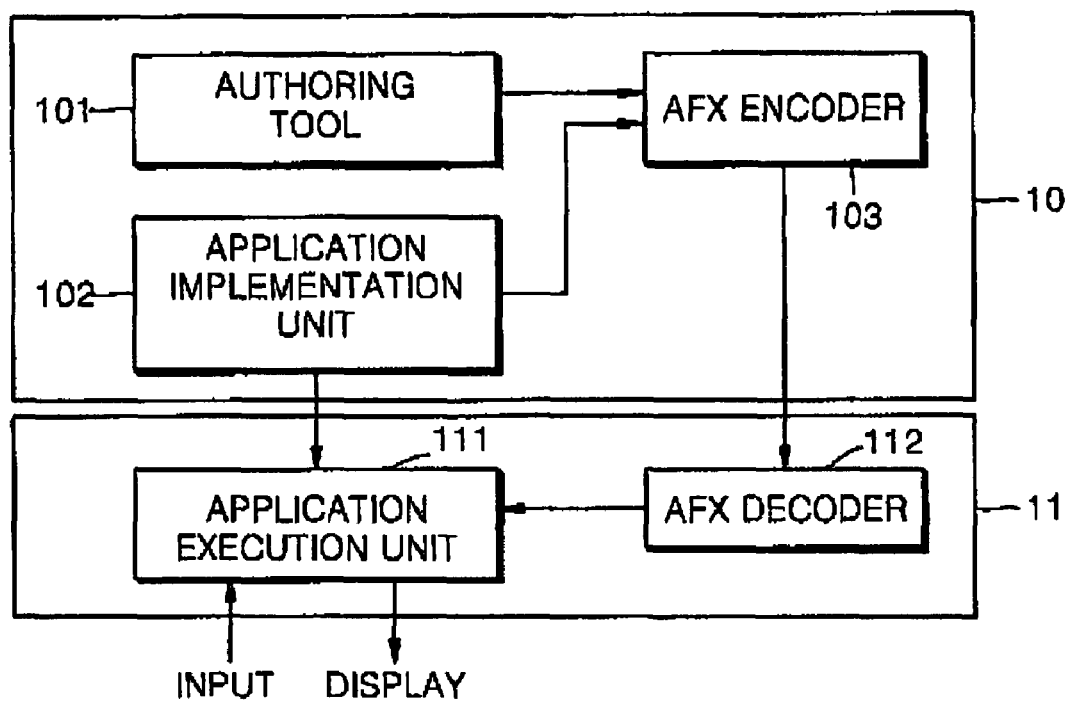
FIG. 1 is a schematic block diagram illustrating a three-dimensional (3D) graphic system according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a schematic block diagram illustrating a three-dimensional (3D) graphic system according to an embodiment of the present invention. 3D graphics may include mobile 3D applications, such as, for example, a 3D game, a 3D graphic user interface (GUI), or a 3D avatar. Referring to FIG. 1, the system includes a 3D graphic authoring device 10 and a 3D graphic operation device 11.

The 3D graphic authoring device 10 includes an authoring tool 101, an application implementation unit 102, and an AFX (Animation Framework eXtension) encoder 103.

The authoring tool 101 creates 3D resources. The 3D resources may include, for example, a 3D mesh, a key-frame sequence, or bone information.

The application implementation unit 102 outputs scene graph information used to display content stored in a data structure in a screen according to, for example, a user's input, an interaction with a user, scene management, Open GL, which is a graphic library, and GFX or DirectX, which are application program interfaces.

The AFX encoder 103 compresses some of the 3D resources from the authoring tool 101, or the information from the application implementation unit 102, and transmits the compression result.

The 3D graphic operation device 11 includes an application execution unit 111 and an AFX decoder 112.

The AFX decoder 112 recovers 3D data by decoding input compression data according to the type of the data.

The application execution unit 111 receives and executes the information from the application implementation unit 102, or executes the 3D resources recovered by the AFX decoder 112.

Figure 2:
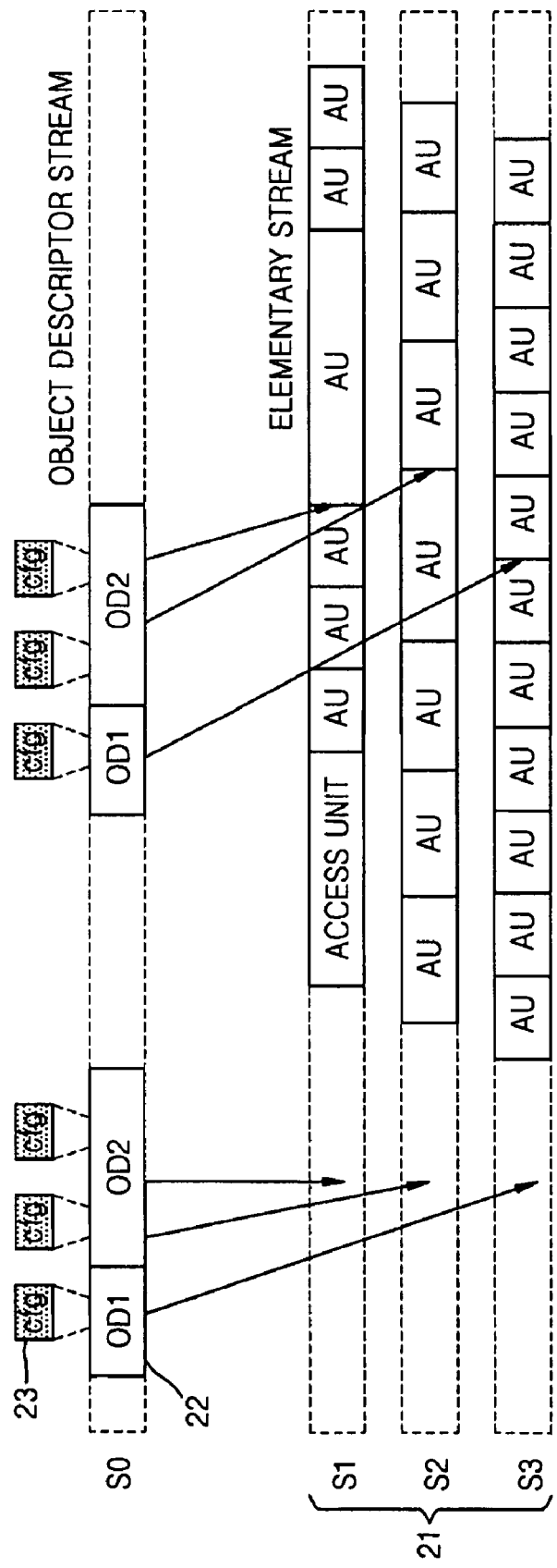
FIG. 2 is a diagram illustrating a structure of compression data according to an MPEG-4 profile based on an MPEG-4 system.

FIG. 2 is a diagram illustrating a structure of compression data according to an MPEG-4 profile based on an MPEG-4 system. Referring to FIG. 2, according to the specification of a system part of the ISO/IEC (International Organization for Standardization/International Electrotechnical Commission) 14496-1, an MPEG-4 system (not shown) inserts an object descriptor 22, which describes the characteristics of a media object (audio or video) and the characteristics of an elementary stream, into an elementary stream 21 comprised of access units (AUs). Configuration information 23 is inserted into the object descriptor 22.

The specification of the system part of the ISO/IEC 14496-1 specifies separate encoding of video data and audio data, and multiplexing and synchronizing of the encoded data in order to store multimedia data in a file or a recording medium or transmit it via a network. It is an MPEG-4 system that defines the data multiplexing. Video or audio binary data that has yet to be multiplexed by the system is referred to as the elementary stream.

In the MPEG-4 standard, object encoding is used to multiplex audio and video data. In this case, both audio data and video data are processed as a single object, and the system multiplexes and synchronizes the objects.

The MPEG-4 standard defines BIFS (Binary Format for Scenes) as a feature used in a scene description by combining and processing a plurality of objects. For example, moving picture data and audio data of a person or a background are encoded as separate objects. Thus, an application can be made, so that the encoded objects are displayed to overlap each other, or a user can move any object.

However, when an application is downloaded and stored by using most basic tools in a mobile environment, the profile illustrated in FIG. 2 is tightly coupled with an MPEG-4 system having a BIFS structure. That is, the profile is inefficient since the MPEG-4 system must be prepared to decode a bitstream encoded by an MPEG-4 AFX tool, thereby increasing the load on the hardware.

Therefore, in an embodiment of the present invention, a 3D compression profile that does not require an MPEG-4 system is adopted. In 3D compression data according to an embodiment of the present invention, configuration information, i.e., header information of an object, is inserted into a start of a bitstream, and, optionally, repeatedly inserted into the bitstream after the start of the bitstream.

Figure 3:
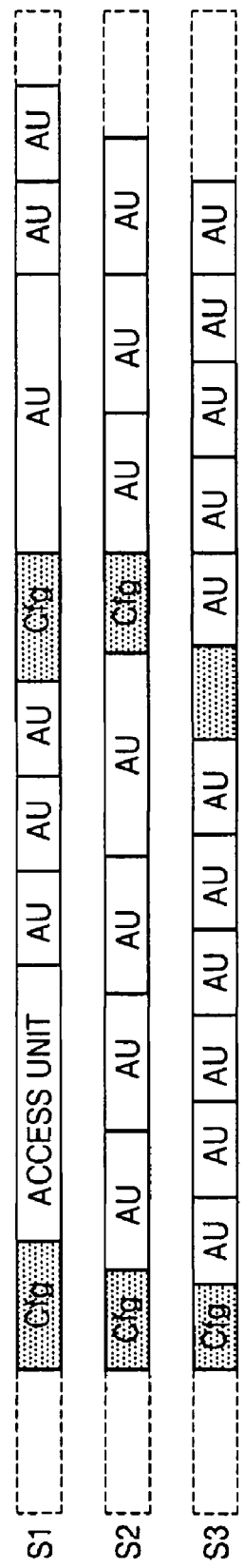
FIG. 3 is a diagram illustrating a structure of a 3D compression data stream according to an embodiment of the present invention.

FIG. 3 is a diagram illustrating a structure of a 3D compression data stream according to an embodiment of the present invention. Referring to FIG. 3, an elementary system includes objects, each having a plurality of access units, and configuration information Cfg of each object.

The data structure illustrated in FIG. 3 is obtained by making objects by encoding 3D data by the AFX encoder 103 of FIG. 1 according to the types of the objects, and inserting configuration information into the corresponding objects and multiplexing the objects by the AFX encoder 103. Here, the types of the objects include 3D mesh coding (3DMC), interpolator coding (IC), a coordinate interpolator (CI), an orientation interpolator (OC), a wavelet subdivision surface (WSS), a position interpolator (PI), and bone-based animation (BBA), which are suggested in the MPEG-4 standard.

Figure 4:
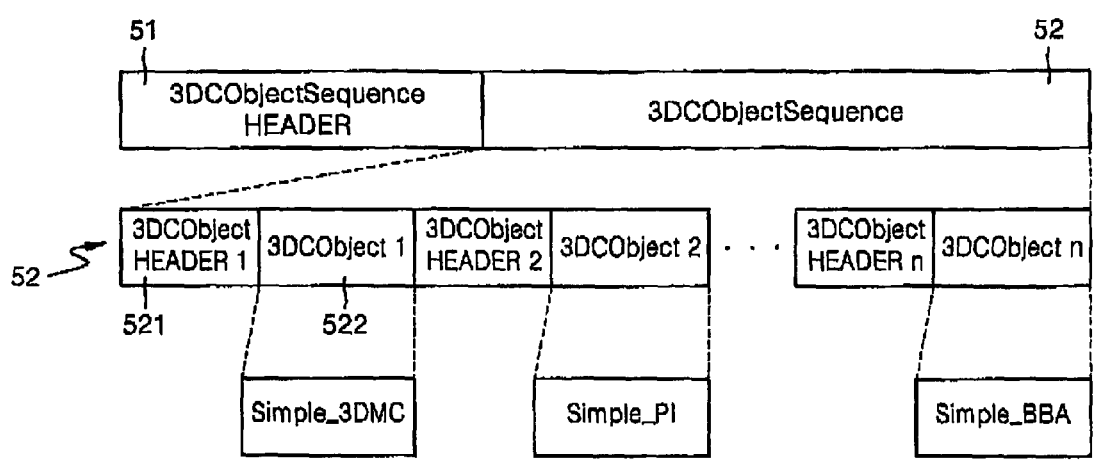
FIG. 4 is a diagram illustrating a multiplexed bit stream output from an AFX encoder illustrated in FIG. 1.

FIG. 4 is a diagram illustrating a data structure of a multiplexed bitstream output from the AFX encoder 103 of FIG. 1. The illustrated bitstream includes a 3DCObjectSequence header 51 and a 3DCObjectSequence 52. The 3DCObjectSequence header 51, which is generated by the AFX encoder 103, includes a profile and level indication of the bitstream. Also, the 3DCObjectSequence header 51 may further include user data defined for a specific application by a user, e.g., scene graph information for the bitstream, which will be described in detail with reference to FIGS. 5A and 5B.

Figure 5A:
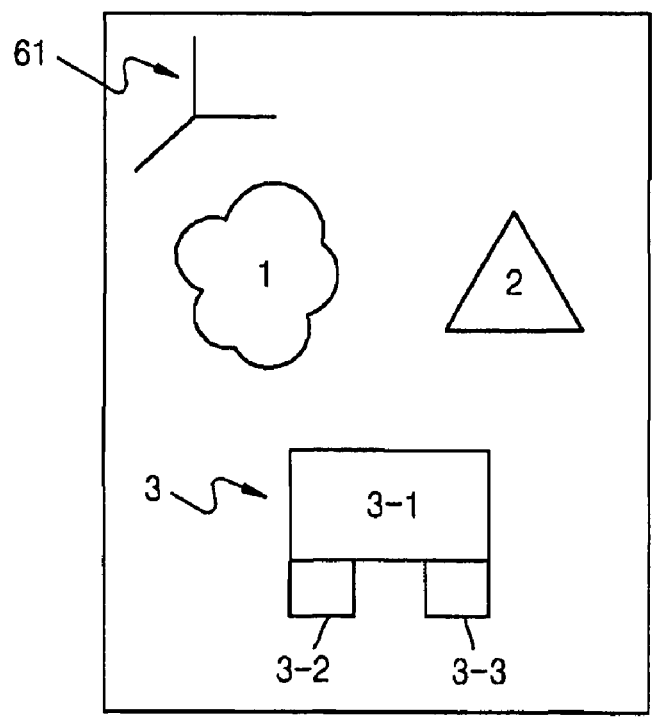
FIG. 5A is a diagram illustrating an example of a scene.
Figure 5B:
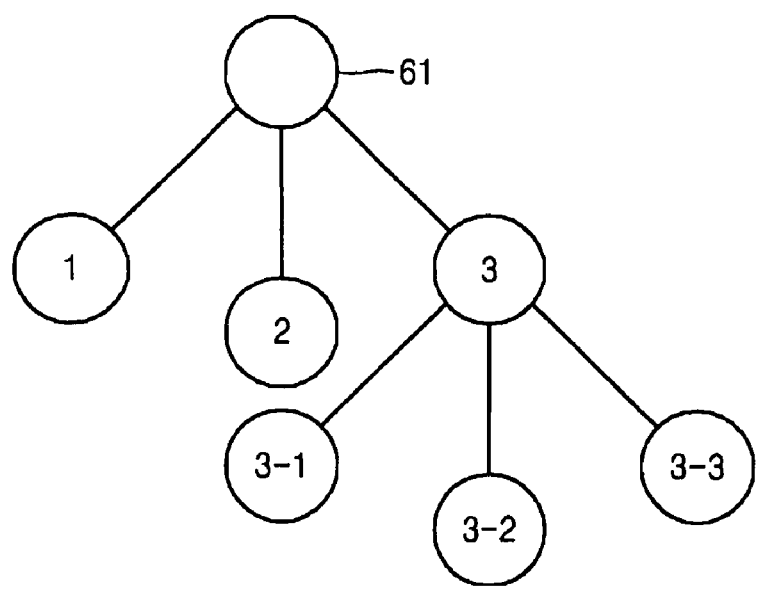
FIG. 5B is a graph illustrating the structure of objects included in the scene illustrated in FIG. 5A.

FIG. 5A is a diagram illustrating an example of a scene. FIG. 5B is a graph illustrating the structure of objects included in the scene illustrated in FIG. 5A. Referring to FIG. 5A, the scene includes objects 1 through 3 defined in world coordinates 61, and the object 3 includes detailed objects 3-1, 3-2, and 3-3. For example, the objects 1 through 3 may be a building, a tree, and a chair, respectively, and the detailed objects 3-1 through 3-3 of the object 3 may respectively be a ball on the chair and the legs of the chair.

The scene illustrated in FIG. 5A may be represented as graph information as illustrated in FIG. 5B. Referring to FIG. 5B, the world coordinates 61 are linked to objects 1 through 3, and the object 3 is linked to detailed objects 3-1, 3-2, and 3-3.

The scene graph information illustrated in FIGS. 5A and 5B may be included as user data in the 3DCObjectSequence header 51 of FIG. 4. For example, the objects 1 through 3, linked to the world coordinates 61, may be included in the user data as the objects for configuring a scene, e.g., a building, a tree, and a chair, and the detailed objects 3-1 through 3-3, which comprise the chair 3, may also be included in the user data as a ball on the chair and the legs of the chair, respectively.

The 3D compression object 3DCObjectSequence 52 includes a plurality of 3DCObject headers 521, and a plurality of individual 3DCObjects 522. Here, each of the 3DCObjects 522 is a 3D compression bitstream, such as, for example, a 3DMC Simple_3DMC, IC (not shown), BBA Simple_BBA, WSS (not shown), or PI Simple_PI, which is encoded by the AFX encoder 103.

The 3DCObject header 521 includes a "3dc_object_verid" field describing the version number of a tool list of a 3D compression object type, and a "3dc_object_type_indication" field that is used in resynchronization and describes the object type of a 3D compression stream to be transmitted and the type of a decoder matching the 3D compression stream. For example, if the "3dc_object_type_indication" field is a "Simple_3DMC" field, the AFX decoder 112 analyzes the "3dc_object_type_indication" field and decodes the 3D compression stream according to a decoding method matching the 3DMC object. Even if more AFX tools and functions are adopted in the tool list of a 3D compression object type, the data structure according to the present invention can be extended by defining further object types in the "3dc_object_type_indication" field in the following syntax.

The 3DCObject header 521 may further include user data that a user defines for a specific application for the 3D compression object. For example, in FIGS. 5A and 5B, a building, a tree, and a chair may be included in a 3DCObject header 1, a 3DCObject header 2, and a 3DCObject header 3, respectively.

The syntax of a process of generating a 3D compression object sequence is as follows:

```
3DCObjectSequence( ) {
    3dc_object_sequence_start_code
    Profile_and_level_indication
    while (next_bits( )== user_data_start_code){
        user_data( )
    }
    do {
        3DCObject( )
    } while ( next_bits( ) != 3dc_object_sequence_end_code)
    3dc_object_sequence_end_code
}
```

In the above code, 3dc_object sequence start_code is a hexadecimal number system of a bit string '000001C0', and starts a 3D compression session. In this case, the Mnemonic is bslbf. The Mnemonic describes the type of data available for a coded bitstream, and bslbf stands for a bit string, left bit first.

Profile_and_level_indication is an 8-bit integer used to signal the profile and level identification of the bitstream, and the meaning of each bit value is indicated in the following table:

TABLE 1

| Profile/Level | Code |
|---|---|
| reserved | 00000000 |
| Simple profile/level 1 | 00000001 |
| Simple profile/level 2 | 00000010 |
| reserved | 00000011 |
| . | . |
| . | . |
| . | . |
| reserved | 11111111 |

In this case, the mnemonic is uimsbf, which stands for unsigned integer, most significant bit first.

3dc_object_sequence_end_code is a hexadecimal number system of a bit string '000001C1', and ends the 3D compression session. In this case, the mnemonic is bslbf.

To generate the 3D compression object sequence, when the 3D compression session starts, user data is generated according to a given profile and level during a period of time in which a next bit is user_data start_code, and 3DCObject is generated during a period of time in which a next bit is not 3dc_object_sequence_end_code.

The syntax of a process of generating the 3D compression object is as follows:

```
3DCObject( ) {
3dc_object_start_code
is_3dc_object_identifier
if(is_3DC_object_identifier){
    3dc_object_verid
    3dc_object_priority
}
3dc_object_type_indication
next_start_code( )
while ( next_bits( )== user_data_start_code){
    user_data( )
}
if (3dc_object_type_indication == "Simple_3DMC") {
```

-continued

```
    3D_Mesh_Object( )
}
else if (3dc_object_type_indication == "Simple_WSSI") {
    WSS_start_code
    Wavelet_Mesh_Object( )
}
else if(3dc_object_type_indication == "Main_CI") {
    CoordIC_start_code
    CompressedCoordinateInterpolator( )
}
else if (3dc_object_type_indication == "Main_OI") {
    OriIC_start_code
    CompressedOrientationInterpolatort( )
}
else if (3dc_object_type_indication == "Main_PI") {
    PosIC_start_code
    CompressedPositionInterpolator( )
}
else if (3dc_object_type_indication == "Simple_BBA")
{
    bba_object( )
}
(more object types and corresponding decoders may further be defined here)
if (next_bits( ) != "000 0000 0000 0000 0000 0001"
    next_start_code( )
}
```

In the above code, 3dc_object_start_code is a hexadecimal number system of a bit string '000001A2', and starts a 3D compression object. In this case, the mnemonic is bslbf.

is_3dc_object_identifier is a 1-bit code, and set to '1' when the version identification and priority of a 3D compression object are defined. In this case, the mnemonic is uimsbf.

3dc_object_verid is a 4-bit code that represents the version number of the 3D compression object. The meanings of the bit values are shown in the following table. If 3dc_object_verid does not exist, the value of 3dc_object_verid is '0001'. In this case, the mnemonic is uimsbf.

TABLE 2

| 3dc_object_verid | Meaning |
| --- | --- |
| 0000 | reserved |
| 0001 | object type listed in Table 3 |
| 0010–1111 | reserved |

Table 3 shows a tool list included in each object type. Current object types may be extended until new tools or functionalities are introduced.

TABLE 3

| | 3D Compression Object Type | | | | | | |
| --- | --- | --- | --- | --- | --- | --- | --- |
| AFX Tool | Simple 3DMC | Simple CI | Simple PI | Simple OI | Simple WSS | Simple BBA | reserved |
| 3DMC | X | | | | | | |
| CI | | X | | | | | |
| PI | | | X | | | | |
| OI | | | | X | | | |
| WSS | | | | | X | | |
| BBA | | | | | | X | |
| reserved | | | | | | | |

In Table 3, "3DMC" stands for 3D Mesh Compression, "CI" stands for Coordinate Interpolator, "PI" stands for Position Interpolator, "OI" stands for Orientation Interpolator, and "WSS" stands for Wavelet Subdivision Surface.

3dc_object_priority is a 3-bit code representing the priority of the 3D compression object. 3dc_object_priority has a value between 1 and 7. Here, '1' represents the highest priority, and '7' represents the lowest priority. '0' is a reserved value. In this case, the mnemonic is uimsbf.

3dc_object_type_indication is a code that indicates the type of the 3D object, is comprised of a 32-bit bit string, and the mnemonic of which is bslbf. The 3dc_object_type_indication is used to limit the subsequent bitstreams to use a tool according to the indicated object type. According to the value of the 3dc_object_type_indication, a corresponding decoder is called and the compressed bit stream is decoded. Object types are listed in Table 3, and object types to be further added can be reflected in Table 4.

TABLE 4

| 3D Compression Object Type | Code |
| --- | --- |
| reserved | 00000000 |
| Simple 3DMC | 00000001 |
| Simple CI | 00000010 |
| Simple PI | 00000011 |
| Simple OI | 00000100 |

TABLE 4-continued

| 3D Compression Object Type | Code |
|---|---|
| Simple WSS | 00000101 |
| Simple BBA | 00000110 |
| reserved | 00000111 . . . 11111111 |

To generate the 3D object, when a session starts, user data is generated according to the version and priority of the 3D compression object during a period of time in which a next bit is user_data_start_code. Next, an object is generated according to the type of the corresponding 3D object.

The syntax of a process of generating the user data is as follows:

```
user_data( ) {
  user_data_start_code
  while( next_bits( ) != "000 0000 0000 0000 0000 0001") {
    user_data
  }
}
``` user_data_start_code is a hexadecimal number system of a bit string '000001B2', and indicates the start of the user data. The user data is continuously generated until another start code is received. In this case, the mnemonic is bslbf.

user_data is an 8-bit integer that is defined for a specific application by a user. If there are a series of user_data bytes, a bit string of 23 or more consecutive '0's is not allowed.

3D_Mesh_Object() or Wavelet_Mesh_Object() is a function of generating compression data according to the type of data, e.g., 3D mesh compression or wavelet subdivision surface. In an embodiment of the present invention, a start code according to the type of data is further generated to the start of compression data prior to generation of the compression data according to the type of data. 3D_Mesh_Object() and bba_object() do not have the start code because they include the start code inside them.

In addition to the above-described embodiments, the method of the present invention can also be implemented by executing computer readable code/instructions in/on a medium, e.g., a computer readable medium. The medium can correspond to any medium/media permitting the storing and/or transmission of the computer readable code. The code/instructions may form a computer program.

The computer readable code/instructions can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The medium may also be a distributed network, so that the computer readable code/instructions is stored/transferred and executed in a distributed fashion. The computer readable code/instructions may be executed by one or more processors.

As described above, according to the present invention, in a mobile environment being limited in power consumption and computational complexity, it is possible to effectively compress 3D graphic data and transmit the compressed 3D graphic data via a wireless network without an MPEG-4 system.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of generating three-dimensional (3D) compression data, the method comprising:
   generating configuration information of a 3D compression data sequence;
   generating a plurality of pieces of individual 3D compression data to be included in the 3D compression data sequence; and
   generating the 3D compression data sequence by combining the plurality of pieces of the individual 3D compression data, combining the 3D compression data sequence with the configuration information, and multiplexing the combined result;
   wherein the generating of each of the plurality of pieces of individual 3D compression data comprises:
   generating individual configuration information of each of the pieces of individual 3D compression data, the individual configuration information including a header corresponding to the individual 3D compression data and the header including a data type code containing information regarding the data type of the individual 3D compression data,
       generating a start code according to a data type of the piece of individual 3D compression data, and
       generating the pieces of individual 3D compression data wherein a type of encoding used to encode each piece of individual 3D compression data corresponds to the data type code of the piece of individual 3D compression data.

2. The method of claim 1, wherein the configuration information comprises profile and level identification information of the 3D compression data sequence.

3. The method of claim 2, wherein the configuration information further comprises user data defining applications of the 3D compression data sequence.

4. The method of claim 3, wherein the user data comprises scene graph information representing the objects included in the scene by using a graph in response to the 3D compression data being graphic data.

5. The method of claim 1, wherein the header of the individual configuration information further comprises a version number of a tool list of the data type.

6. The method of claim 5, wherein the header of the individual configuration information further comprises user data defining applications of the pieces of individual 3D compression data.

7. The method of claim 5, wherein the types of the objects, indicated by the data type code, include 3D mesh coding (3DMC), interpolator coding (IC), a coordinate interpolator (CI), an orientation interpolator (OC), a wavelet subdivision surface (WSS), a position interpolator (PI), and bone-based animation (BBA).

8. A method of recovering three-dimensional (3D) compression data, the method comprising:
   separating a 3D compression data sequence and configuration information of the 3D compression data sequence from a received, multiplexed signal;
   separating a plurality of pieces of individual 3D compression data and individual configuration information for each of the pieces of individual 3D compression data from the 3D compression data sequence, the individual configuration information including a header corresponding to the individual 3D compression data and the header including a data type code containing information regarding a data type of the individual 3D compression data;

separating each start code from the pieces of individual 3D compression data according to the data type code of each of the pieces of individual 3D compression data; and decoding each of the pieces of individual 3D compression data using the data type included in the individual configuration information, wherein a type of decoding used to decode each piece of individual 3D compression data corresponds to the data type code of the piece of individual 3D compression data.

9. The method of claim 8, wherein the configuration information comprises profile and level identification information of the 3D compression data sequence.

10. The method of claim 9, wherein the configuration information further comprises user data defining applications of the 3D compression data sequence.

11. The method of claim 8, wherein the header of the individual configuration information further comprises a version number of a tool list for a data type of the individual 3D compression data.

12. The method of claim 11, wherein the header of the individual configuration information further comprises user data defining applications of the pieces of individual 3D compression data.

13. An apparatus to generate three-dimensional (3D) compression data, the apparatus comprising:

an encoder which generates different pieces of individual 3D compression data by encoding received 3D data according to a data type of the 3D data, generates a 3D compression data sequence by generating individual configuration information for each of the pieces of individual 3D compression data and combining the individual configuration information with the corresponding piece of individual 3D compression data, respectively, generates configuration information of the 3D compression data sequence, combines the configuration information with the 3D compression data sequence, and multiplexes the combined result, wherein the individual configuration information includes a header corresponding to the individual 3D compression data and the header includes a data type code containing information regarding the data type of the individual 3D compression data, wherein, prior to the generation of the pieces of individual 3D compression data, the encoder generates a start code according to the data type of the pieces of individual 3D compression data and wherein the encoding of the received 3D data according to the data type of the 3D data comprises using an encoding method that corresponds to the data type code of the piece of individual 3D compression data to encode the piece of individual 3D compression data.

14. The apparatus of claim 13, wherein the encoder generates the configuration information so that the configuration information comprises profile and level identification information of the 3D compression data sequence.

15. The apparatus of claim 14, wherein the encoder generates the configuration information so that the configuration information further comprises user data which defines applications of the 3D compression data sequence.

16. The apparatus of claim 13, wherein the encoder generates the individual configuration information so that the header of the individual configuration information includes a version number of a tool list of the data type of the pieces of individual 3D compression data.

17. The apparatus of claim 16, wherein the encoder generates the individual configuration information so that the header of the individual configuration information further comprises user data defining applications of the pieces of individual 3D compression data.

18. The apparatus of claim 13, wherein the encoder generates the configuration information so that the configuration information further comprises user data defining applications of the 3D compression data sequence.

19. An apparatus to recover three-dimensional (3D) compression data from a received signal, the apparatus comprising:

a decoder which separates a 3D compression data sequence and configuration information of the 3D compression data sequence from the received, multiplexed signal; separates a plurality of pieces of individual 3D compression data and individual configuration information for each of the pieces of individual 3D compression data from the 3D compression data sequence; analyzes a data type code comprising information of a data type of the pieces of individual 3D compression data, which is included in the individual configuration information; and decodes each of the pieces of individual 3D compression data according to a respective data type code, wherein the individual configuration information includes a header corresponding to the individual 3D compression data, wherein the decoder separates a start code from the pieces of individual 3D compression data according to the data type, and wherein the decoding of each of the pieces of individual 3D compression data according to the data type code comprises using a decoding method that corresponds to the data type code of the piece of individual 3D compression data to decode the piece of individual 3D compression data.

20. At least one non-transitory computer readable medium storing instructions that control at least one processor to perform a method of generating three-dimensional (3D) compression data, the method comprising:

generating configuration information of a 3D compression data sequence;

generating a plurality of pieces of individual 3D compression data to be included in the 3D compression data sequence; and generating the 3D compression data sequence by combining the plurality of pieces of the individual 3D compression data, combining the 3D compression data sequence with the configuration information, and multiplexing the combined result;

wherein the generating of each of the plurality of pieces of individual 3D compression data comprises:

generating individual configuration information of each of the pieces of individual 3D compression data, the individual configuration information including a header corresponding to the individual 3D compression data and the header including a data type code containing information regarding the data type of the individual 3D compression data;

generating a start code according to a data type of the piece of individual 3D compression data; and generating the pieces of individual 3D compression data wherein a type of encoding used to encode each piece of individual 3D compression data corresponds to the data type code of the piece of individual 3D compression data.

21. At least one non-transitory computer readable medium storing instructions that control at least one processor to perform a method of recovering three-dimensional (3D) compression data, the method comprising:

separating a 3D compression data sequence and configuration information of the 3D compression data sequence from a received, multiplexed signal;

separating a plurality of pieces of individual 3D compression data and individual configuration information for each of the pieces of individual 3D compression data from the 3D compression data sequence, the individual configuration information including a header corresponding to the individual 3D compression data and the header including a data type code containing information regarding a data type of the individual 3D compression data;

separating each start code from the pieces of individual 3D compression data according to the data type code of each of the pieces of individual 3D compression data; and decoding each of the pieces of individual 3D compression data using the data type included in the individual configuration information, wherein a type of decoding used to decode each piece of individual 3D compression data corresponds to the data type code of the piece of individual 3D compression data.

22. A method of generating three-dimensional (3D) compression data, the method comprising:

generating configuration information of a 3DCObjectSequence, which is the 3D compression data;

generating 3DCObjects, which are a plurality of pieces of individual 3D compression data and are included in the 3D compression data; and generating a 3D compression data sequence by combining the plurality of pieces of individual 3D compression data, combining the 3D compression data sequence with configuration information of the 3D compression data sequence, and outputting the combined result;

wherein the generating of the 3DCObjects comprises:
generating individual configuration information of the respective pieces of individual 3D compression data,
generating a start code according to a data type of the respective pieces of individual 3D compression data, and
generating the individual 3D compression data according to the data type,
wherein the generation of the pieces of individual 3D compression data is realized by:

```
3DCObject( ) {
    3dc_object_start_code
    is_3dc_object_identifier
    if(is_3DC_object_identifier){
        3dc_object_verid
        3dc_object_priority
    }
    3dc_object_type_indication
    next_start_code( )
    if (3dc_object_type_indication == "Simple_3DMC") {
        3D_Mesh_Object( )
    }
    else if (3dc_object_type_indication == "Simple_WSSI") {
        WSS_start_code
        Wavelet_Mesh_Object( )
    }
    else if (3dc_object_type_indication == "Main_CI") {
        CoordIC_start_code
        CompressedCoordinateInterpolator( )
    }
```
```
    else if (3dc_object_type_indication == "Main_OI") {
        OriIC_start_code
        CompressedOrientationInterpolatort( )
    }
    else if (3dc_object_type_indication == "Main_PI") {
        PosIC_start_code
        CompressedPositionInterpolator( )
    }
    else if (3dc_object_type_indication == "Simple_BBA")
    {
        bba_object( )
    }
    (more object types and corresponding decoders can be defined.)
    if (next_bits( ) != "000 0000 0000 0000 0000 0001"
        next_start_code( )
},
``` and wherein 3dc_object_start_code denotes code representing a start of a 3DCObject, is_3dc_object_identifier denotes an identifier of the 3DCObject, 3dc_object_verid denotes code representing identification of a version of the 3DCObject, 3dc_object_priority denotes code representing a priority of the 3DCObject, 3dc_object_type_indication denotes the data type of the individual 3D compression data, WSS_start_code, CoordIC_start_code, and PosIC_start_code, are start codes for data types, respectively.

23. The method of claim 22, wherein the configuration information of the 3DCObject further comprises user data defining applications of the 3DCObject,
wherein the user data is realized by:

```
while (next_bits( )== user_data_start_code){
    user_data( )
},
``` and wherein user_data_start_code denotes code representing a start of the user data.

24. The method of claim 22, wherein the configuration information comprises:
3dc_object_squence_start_code being the start code of the 3D compression data sequence; and
Profile_and_level_indication being profile and level identification information of the 3D compression data sequence.

25. The method of claim 24, wherein the configuration information further comprises user data defining applications of the 3D compression data sequence,
wherein the user data is realized by:

```
while (next_bits( )== user_data_start_code){
    user_data( )
},
``` and wherein user_data_start_code denotes code representing a start of the user data.

26. A method of generating a three-dimensional (3D) compression data sequence including a plurality of pieces of individual 3D compression data, the method comprising:
generating individual configuration information of each of the respective pieces of individual 3D compression data, the individual configuration information including a header corresponding to the individual 3D compression data, wherein the header comprises a field describing a version number of a tool list of the data type and a data type code containing information regarding the data type of the individual 3D compression data;

generating a start code according to the data type of the respective pieces of individual 3D compression data; and generating a plurality of pieces of individual 3D compression data to be included in the individual 3D compression data sequence wherein a type of encoding used to encode each piece of individual 3D compression data corresponds to the data type code of the piece of individual 3D compression data.

27. The method of claim 26, further comprising generating configuration information of the 3D compression data sequence, and combining the 3D compression data sequence with the configuration information.

28. A method of recovering three-dimensional (3D) compression data from a 3D compression data sequence, the method comprising:

separating a plurality of pieces of individual 3D compression data and individual configuration information for each of the pieces of individual 3D compression data from the 3D compression data sequence, the individual configuration information including a header corresponding to the individual 3D compression data wherein the header comprises a field describing a version number of a tool list of the data type and a data type code containing information regarding the data type of the individual 3D compression data; and decoding each of the pieces of individual 3D compression data using a data type included in the individual configuration information wherein a type of decoding used to decode each piece of individual 3D compression data corresponds to the data type code of the individual 3D compression data.

29. The method of claim 28, further comprising separating each start code from the pieces of individual 3D compression data according to the data type of each of the pieces of individual 3D compression data.

* * * * *

UNITED STATES PATENT AND TRADEMARK OFFICE
CERTIFICATE OF CORRECTION

| | | |
|---|---|---|
| PATENT NO. | : 8,014,621 B2 | Page 1 of 1 |
| APPLICATION NO. | : 11/401348 | |
| DATED | : September 6, 2011 | |
| INVENTOR(S) | : Ahn et al. | |

It is certified that error appears in the above-identified patent and that said Letters Patent is hereby corrected as shown below:

Column 11, Line 49, In Claim 13, delete "data" and insert -- data, --, therefor.

Column 14, Line 25 (Approx.), In Claim 22, after "CoordIC_start_code," insert -- OriC_start_code, --.

Column 14, Line 25 (Approx.), In Claim 22, delete "PosIC_start_code," and insert -- PosIC_start_code --, therefor.

Signed and Sealed this
Seventh Day of February, 2012

David J. Kappos
*Director of the United States Patent and Trademark Office*